(12) United States Patent
Chun et al.

(10) Patent No.: US 6,379,606 B1
(45) Date of Patent: Apr. 30, 2002

(54) METHOD FOR THERMOFORMING TWIN SHEET WORKPIECE

(75) Inventors: Victor L. Chun, Midland; Roderick P. Schulte, Saginaw, both of MI (US)

(73) Assignee: Brown Machine, LLC., Beaverton, MI (US)

(*) Notice: Subject to any disclaimer, the term of this patent is extended or adjusted under 35 U.S.C. 154(b) by 0 days.

(21) Appl. No.: 09/441,767

(22) Filed: Nov. 17, 1999

(51) Int. Cl.[7] .................. B29B 13/02; B29C 65/00; B29C 69/00
(52) U.S. Cl. ................ 264/545; 156/285; 156/292; 264/248; 425/503; 425/504
(58) Field of Search .................. 264/545, 248; 156/285, 292; 425/503, 504, 518, 519, 520, 521; 65/308, 251

(56) References Cited

U.S. PATENT DOCUMENTS

| | | | |
|---|---|---|---|
| 3,779,687 A | * | 12/1973 | Alesi |
| 3,868,209 A | * | 2/1975 | Howell |
| 5,658,523 A | * | 8/1997 | Shuert |
| 5,759,591 A | * | 6/1998 | Rhoades et al. |
| 6,187,252 B1 | * | 2/2001 | Rhoades et al. |

* cited by examiner

Primary Examiner—Jan H. Silbaugh
Assistant Examiner—Geoffrey Shipsides
(74) Attorney, Agent, or Firm—John R. Benefiel

(57) ABSTRACT

A twin sheet thermoforming method and apparatus of a type using a rotary wheel to carry each of a series of clamping frames for releasably holding sheets to be formed through successive processing stations. The clamping frames can be shuttled on the wheel to be alternatively located for alignment with one of two forming tooling sets at a forming station, and to be shiftable at an unload-load station so that unloading and loading do not occur at the same location.

7 Claims, 5 Drawing Sheets

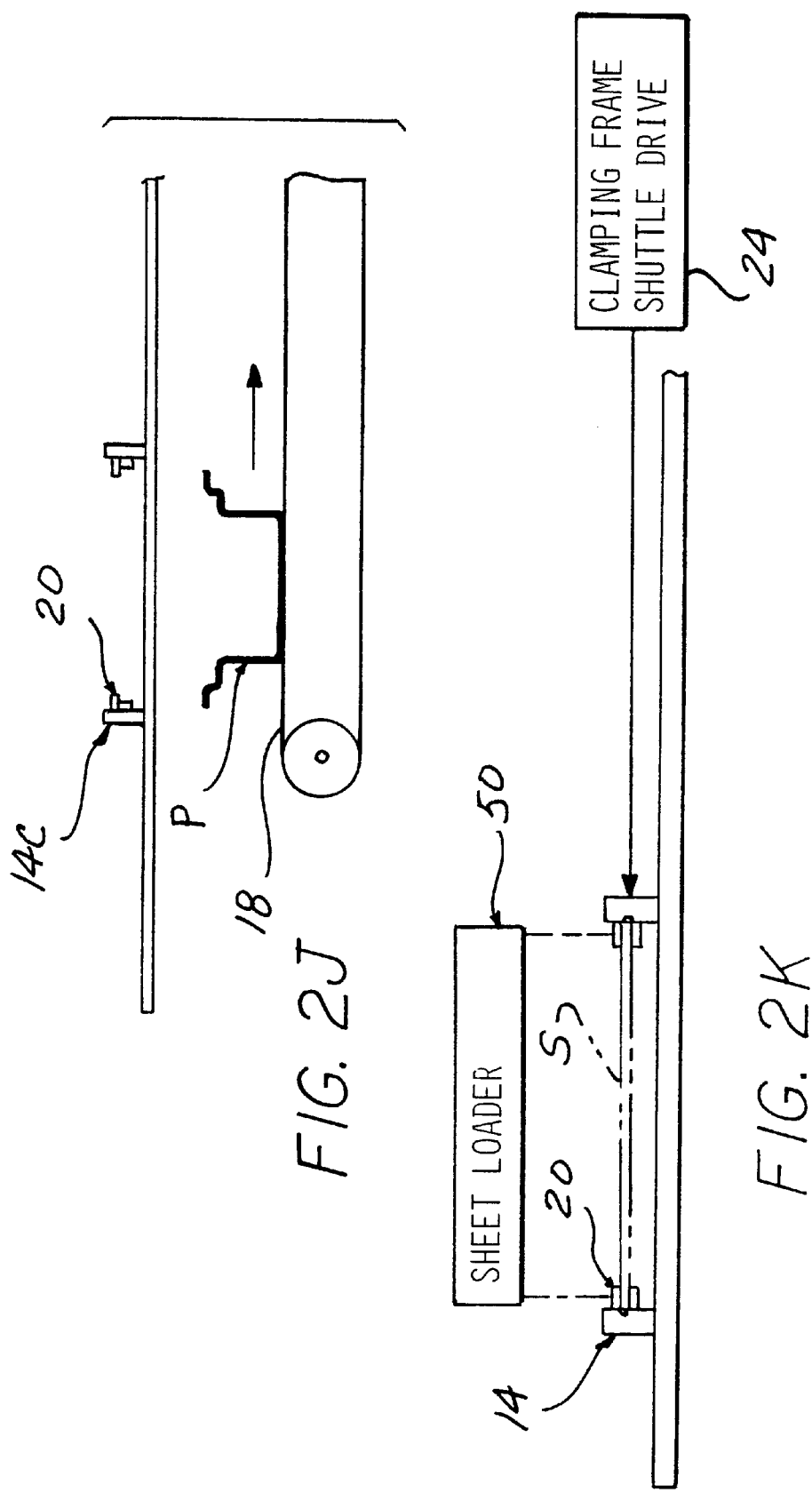

METHOD FOR THERMOFORMING TWIN SHEET WORKPIECE

BACKGROUND OF THE INVENTION

This invention concerns thermoforming methods and apparatus, and more particularly thermoforming parts using two sheets, each individually formed and the two pieces then fused together to complete the part. Thermoforming involves drawing a heated plastic sheet against a mold surface using vacuum and/or air pressure. In the twin sheet process, two pieces are thermoformed in a forming station, and upper and lower platens holding the two formed pieces are forced together to fuse the two pieces together and complete the part.

It is sometimes desirable to utilize a well known technique called "plugging" for deep formed parts, in which a complementary shaped tool assists in thermoforming the part against a mold surface. That is, there is a male and a female part to the tooling, one the mold, the other the plug assist tool.

This technique produces more uniform wall thickness in deep formed parts.

Plugging is difficult to practice in conventional twin sheet thermoforming, as the need to locate the plug tools opposite the mold would prevent the separately formed pieces aligned at the forming station from being pressed together.

Special arrangements have been devised to allowing plugging to be practiced in twin sheet thermoforming processes.

U.S. Pat. No. 5,658,523 issued on Aug. 19, 1997 for a "Method and Apparatus for Forming Twin Sheet Hollow Plastic Articles" describes a process in which two sheets are loaded into a pair of side by side clamping frames, which are both simultaneously transferred by indexing of a rotary wheel carrier through a heating oven, and then to a forming station, where side by side molds and plug assist tools form each part piece. One of the molds, with one of the part pieces held therein is shifted laterally (after withdrawal of the plug assist tool) to lie beneath the other mold holding the other part piece, and the two pieces are fused together. The joined pieces are transferred to a cold forming station where the part is completed by a final forming operation.

The side by side simultaneous transfer of two clamp frames and sheets requires a large oven for heating both sheets at once, and also makes it difficult to carry out different degrees of heating for different sheet thicknesses.

Another disadvantage is that removal of a finished workpiece is conducted at the same location where one of the new sheets must be loaded, complicating the sheet load mechanism.

It is the object of the present invention to provide a twin sheet rotary transfer thermoforming apparatus in which a side by side simultaneous transfer of two sheets is not required when using plug assist tooling to form each part piece.

SUMMARY OF THE INVENTION

The above object and others which will become apparent upon a reading of the following specification and claims are achieved by loading sheets one at a time into each of a series of clamping frames disposed about a rotary transfer wheel, which indexes to bring each clamping frame into each of the processing stations, including preliminary and final heating stations, a forming station, and an unload-load station.

Each clamping frame is mounted on the transfer wheel station to be able to be located in either of two shifted positions on the wheel structure by action of a shuttle transfer drive shifting clamping frame between either of these two positions.

In the unload-load station, unloading takes place in one position of the clamping frame, and the clamping frame is then shifted to the other position where loading of a new sheet takes place, simplifying the design of the sheet loading mechanism.

Each sheet is then successively carried by indexing of the transfer wheel into one or more heating stations. Preferably, a preheat and final heat stations are provided to reduce cycle time.

The clamping frame is shuttled to the one position for the first of each two succeeding sheets indexed into the form station, so that sheet is disposed in one of two forming tooling sets, including a mold and a plug assist, whereat forming of the first part piece is carried out. The clamping frame releases the piece to allow that piece to remain in the mold and be retracted with the mold platen.

The next successive sheet is moved into the other of the tooling sets by the next wheel index, since its clamping frame remains in the one position on the wheel, and the second piece is then formed.

After forming, the top platen remains lowered and only the bottom platen is retracted, the second formed piece remaining clamped in its clamping frame. The top platen of the other tooling set is then transferred over the bottom mold of the one tooling set, carrying the piece and clamping frame with it. The two pieces are then fused by operation of respective press platens to form a completed part.

The finished part is then rotated to the unload-load station with the next wheel index, and the clamping frame releasing the part to allow it to drop onto a conveyor.

The clamping frame is then shuttled to the other shifted position of the wheel for loading of a fresh sheet.

The one at a time transfer of the sheets makes individualized heating of the two sheets easier and reduces the oven size required, while using a preheat oven reduces cycle time. Since part unloading and sheet loading take place at two different locations, the loading mechanism is simplified.

DESCRIPTION OF THE DRAWING FIGURES

FIGS. 2A–2K are diagrammatic side elevational views of the main components of the apparatus shown in FIG. 1, in various stages of operation of the apparatus.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
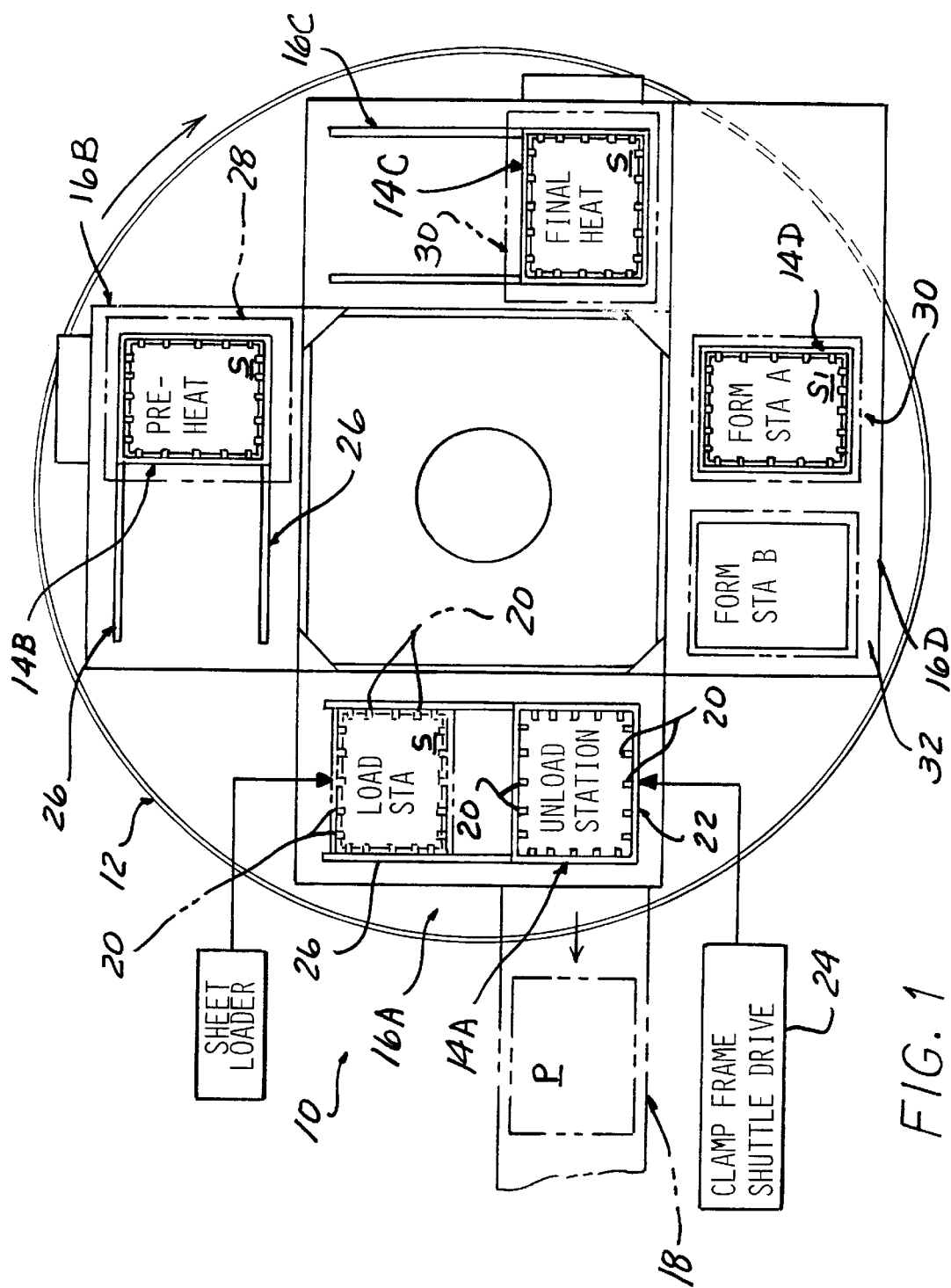
FIG. 1 is a diagrammatic plan view of a rotary twin sheet thermoforming apparatus according to the present invention.

Referring to FIG. 1, the thermoforming machine 10 according to the invention includes a rotary wheel structure 12 of the well known type which is able to be indexed to sequentially transfer each of a set of clamping frames 14A–14D through a series of machine stations 16A–16D whereat various operations are performed.

According to the invention, the clamping frames 14A–14D are mounted on the wheel structure 12 so as to be capable of being shuttled thereon between two shifted positions, i.e., between an advanced position and a retracted position for a purpose to be described herein.

Figure 2A:
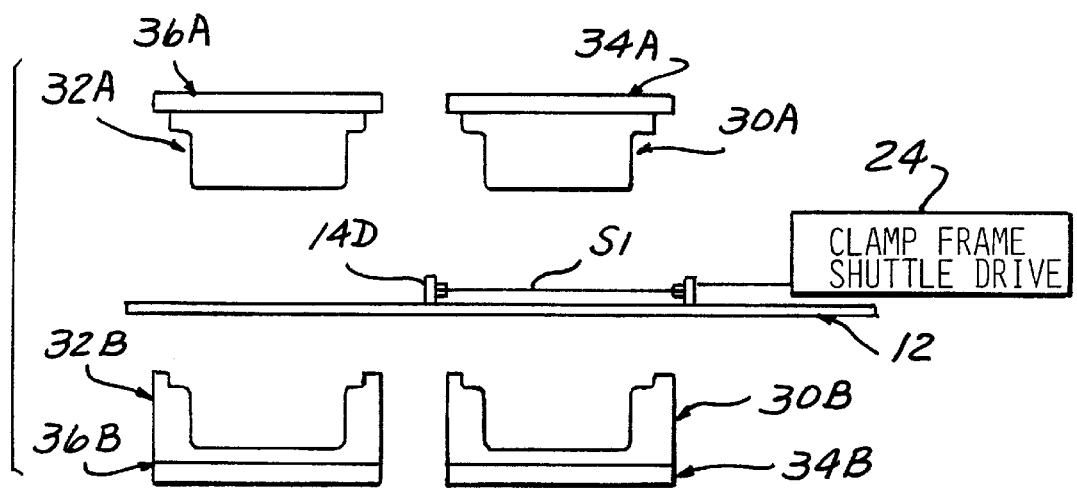

Each clamping frame 14A–14D is constructed with a series of releasable gripper clamps 20 arranged around the inner perimeter of a frame structure 22 thereof in the well known manner (depicted diagrammatically in station 16A and FIGS. 2J, 2K). Such clamping frame construction is well known, as described in U.S. Pat. No. 5,658,523 referenced above. See also U.S. Pat. Nos. 3,910,747; 4,097,035; and 4,938,678. The assignee of the present application also is the assignee of copending U.S. Ser. No. 09/332,702 filed on Jun. 14, 1999 describing a powered adjustable clamping frame.

Station 16A is where unloading and loading of the clamping frames occurs. A completed part P is released from clamping frame 14A by opening of gripper clamps 20 to be deposited on a conveyor 18 extending beneath the retracted position of the clamping frame 14A.

After release of a part P, the clamping frame 14A is shuttled to its advanced position by a shuttle drive 24 sliding the clamping frame 14A on guides 26 to a loading position offset from the unload position.

A fresh sheet of plastic S is loaded into the clamping frame 14A, and the gripper clamps 20 activated.

At station 16B, the previously loaded sheets are transported by the wheel index movement into a preheat oven 28 which partially heats the sheet S preparatory to being moved into the next station 16C, where final heating is carried out in another oven 30.

The next wheel index carries the now fully heated sheet S into the forming station 16D.

The forming station 16D includes two mold-plug assist tooling sets 30, 32.

A pair of sheets $S_1$, $S_2$, are successively indexed into the forming station 16D, and individually formed in tooling sets 30, 32 to form the two respective part pieces fused together to produce the part P.

The first sheet $S_1$, in each pair is shuttled to the retracted position during index to be received in tooling set 30.

The next sheet $S_2$ remains in the advanced position and is thereby transported into tooling set 32 by the next indexing motion of the wheel structure 12.

Reference is now made to FIGS. 2A–2L for further details concerning the forming steps. The tooling sets 30, 32 each include an upper tool 30A, 32A driven by upper press platen 34A, 36A, and a lower tool 30B, 32B each driven by a lower platen 34B, 36B, separated as shown during wheel indexing.

The first sheet $S_1$ in each pair is disposed in tooling set 30 by shuttling the clamping frame 14 holding the sheet $S_1$ holding the sheet $S_1$ to the retracted position shown by the shuttle drive 24.

The tooling sets can be comprised of male or female molds and male or female plug assists. In the arrangement depicted, a female mold 30B is shown in tooling set 30 and a male mold 32A in set 32.

Figure 2B:
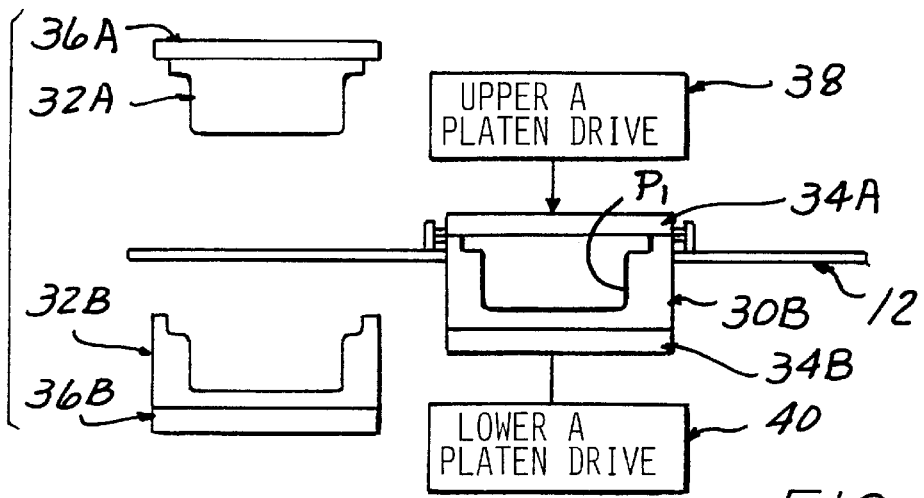

FIG. 2B shows the first sheet $S_1$ being formed into a first part piece $P_1$ by movement together of the platens 34A, 34B by respective platen drives 38, 40.

Figure 2C:
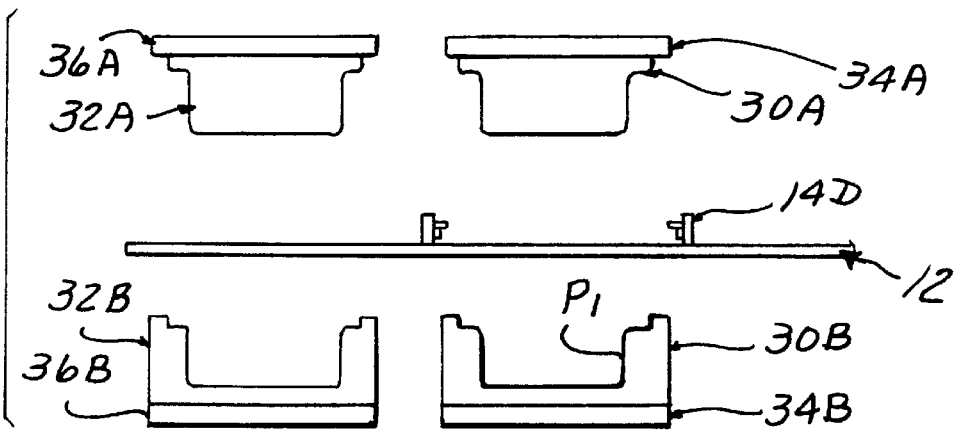

FIG. 2C shows the clamps 20 on frame 14D opened to release the part piece $P_1$ which remains in the female mold 30B as the platens 34A, 34B separate.

Figure 2D:
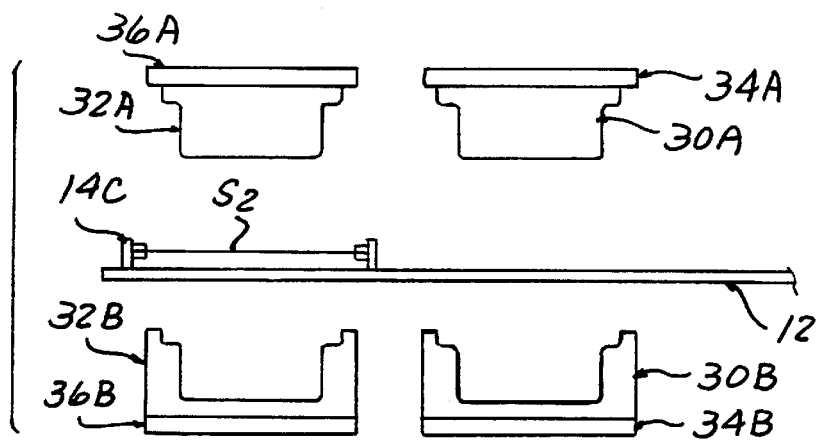

FIG. 2D shows the second sheet $S_2$ carried in frame 14C transferred into the tooling set 32 by the next indexing of the wheel structure. The clamping frame 14D is carried out of the station 16D by the same indexing cycle.

Figure 2E:
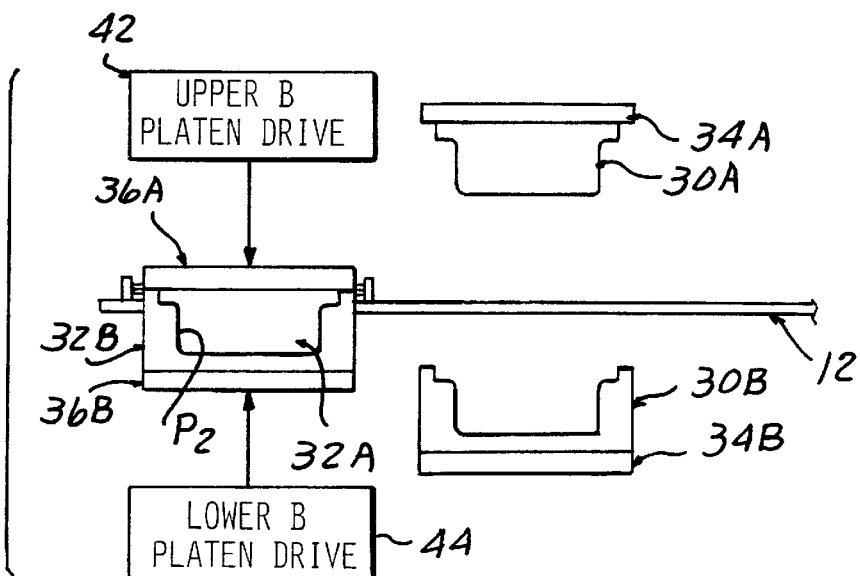

FIG. 2E shows the second part piece $P_2$ formed by driving the platens 36A, 36B together by platen drives 42, 44.

Figure 2F:
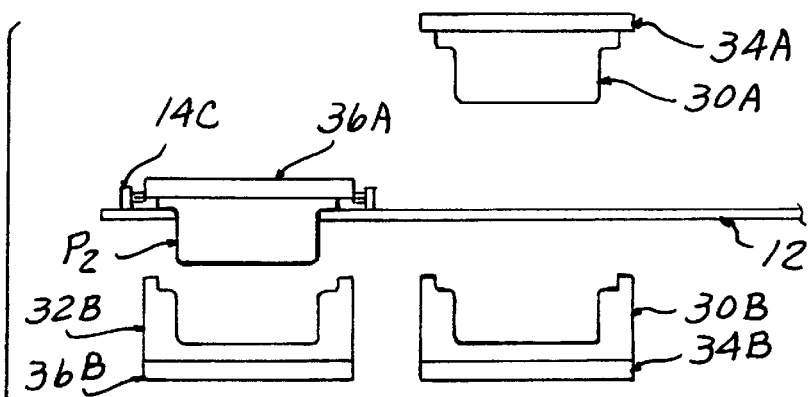

FIG. 2F shows retraction of the lower platen 36B only, the part piece $P_2$ still clamped in the clamping frame 14C.

Figure 2G:
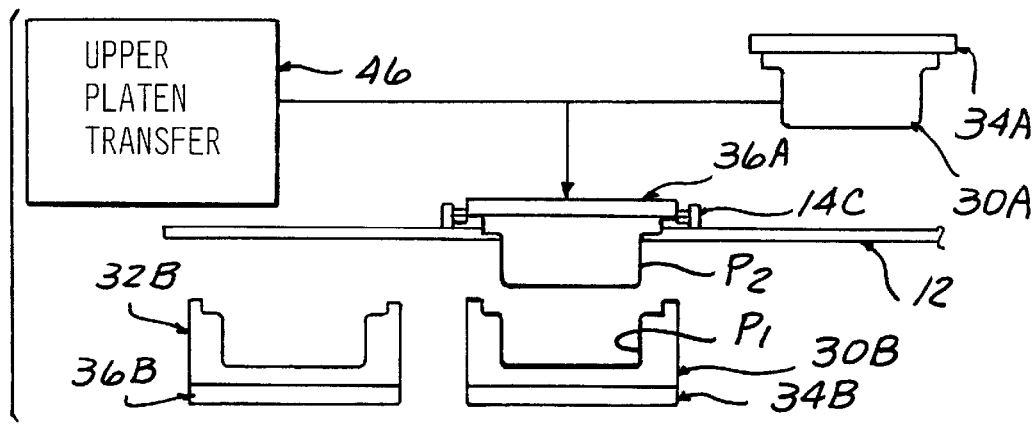

FIG. 2G shows an upper platen transfer drive 46 moving the upper platen 36A, clamping frame 14C and part piece $P_2$ over the other part piece $P_1$ and female mold 30B and platen 34B. At the same time, the upper tooling 30A and platen 34A are shifted to an idle position out of the way by the transfer drive 46.

Figure 2H:
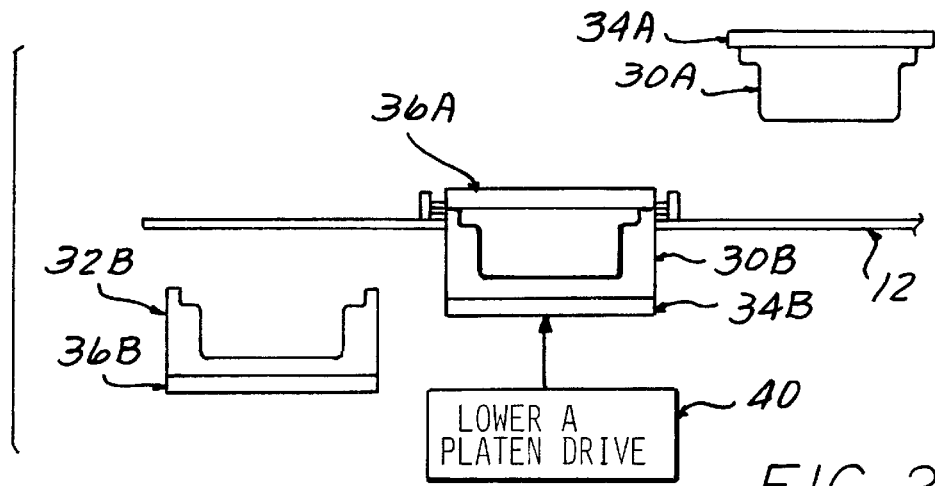

FIG. 2H shows the part P being formed by fusing of the pieces $P_1$, $P_2$ together by raising platen 34B.

Figure 2I:
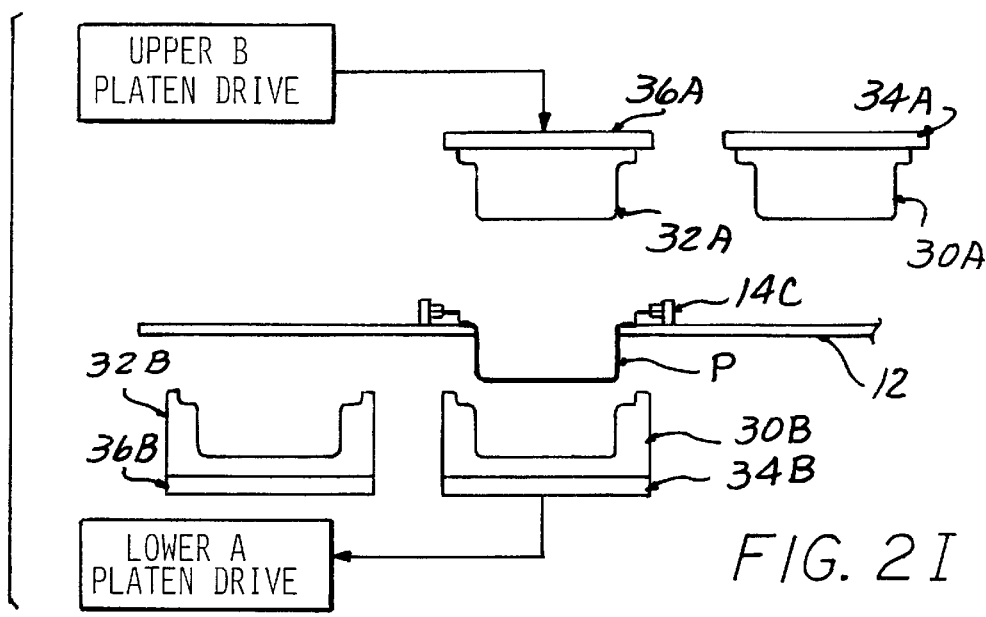

FIG. 2I shows retraction of both platens 34B, 36A leaving the part P in the clamping frame 14C.

In the next wheel indexing cycle, the part P and the clamping frame 14C are carried to the unload-load station 16A. The clamping frame 14C is in the retracted position to be disposed over the conveyor 18 so that by release of the clamps 20, the part P can drop onto the conveyor 18 (FIG. 2J).

FIG. 2K shows shifting of the clamping frame 14C to the advanced position by shuttle drive 24 where it is loaded with a fresh sheet S by a sheet loader 50. The previously transferred frame 14D has undergone the same shift-loading process.

The process is then repeated to produce additional parts P.

The sequential transfer of sheets $S_1$, $S_2$ allows individual heating of these sheets. In addition, the shuttle system allows separate locations for unloading of the part and loading of the next sheet.

It should be appreciated that various part shapes are commonly made by the twin sheet process, including opposite formed cavities, such as are commonly used for making gas tanks, etc., in addition to the nested pieces as shown in the drawings, commonly used for making pallets.

What is claimed is:

1. A method of making a part by individually thermoforming two separate sheets of thermoformable material including the steps of:

successively indexing each of said two sheets in individual clamping frames mounted at different locations on a transfer structure through at least one heating station for successively heating each sheet during successive heating cycles by indexing movement of said transfer structure;

indexing a first one of said sheets held in one of said clamping frames from said heating station into a forming station after undergoing a heating cycle by indexing movement of said transfer structure, and positioning said first sheet in a first tooling set including a mold and a plug assist;

thermoforming said first sheet in said first tooling set into a formed first part piece;

thereafter indexing a second one of said sheets and another of said clamping frames in which said second sheet is held, said another clamping frame mounted to said transfer structure at a location on said transfer structure trailing said location of said first sheet and clamping frame, said indexing occurring after said second sheet has undergone a succeeding heating cycle;

positioning said second sheet in a second tooling set in said forming station including a mold and plug assist, said second tooling set offset from said first tooling set;

thermoforming said second sheet in said second tooling set into a formed second part piece;

the improvement wherein one of said positioning steps includes the step of shuttling one of said sheets and clamping frames by relative movement on said transfer structure from a first shifted position to a second shifted position in order to align said one of said sheets with an associated tooling set in said forming station.

2. The method according to claim 1 wherein each of said two sheets and clamping frames are also successively indexed by movement of said transfer structure into a preheating station prior to being indexed into said heating station to be preheated prior to being finally heated in said heating station.

3. The method according to claim 1 wherein said indexing by said transfer structure is carried out by indexing a rotary wheel comprising said transfer structure.

4. The method according to claim 1 further including the step of shifting one portion of one of said first or second tooling sets into alignment with a portion of the other of said first or second tooling sets, with each one and the other tooling set portions carrying respective formed part pieces and thereafter fusing said part pieces together by forcing said tooling portions and part pieces together to make said part.

5. The method according to claim 4 wherein
each said clamping frame and associated sheet is indexed into a different said shifted position of the transfer structure to be aligned with an associated tooling set in which each is thermoformed, and wherein one of said part pieces is released from said clamping frame in which it is held after forming to allow withdrawal of said part piece with the withdrawal of said tooling set portion carrying said part piece, and the other part piece is allowed to remain in said clamping frame in which it is held and said other tooling set portion is not withdrawn after forming, and wherein said other part piece is shifted to bring both part pieces into the same shifted position when said respective tooling set portions are brought into alignment, said part carried in said other part piece associated clamping frame into an unload-load station by indexing of said transfer structure, said part released from said associated clamping frame to be able to be unloaded therefrom.

6. The method according to claim 5 further including the step of shuttling said associated clamping frame on said transfer structure to a said first shifted position thereon after unloading said part, and thereafter loading a new first sheet into said clamping frame at said first shifted position.

7. The method according to claim 4 further including the step of shifting a remaining portion of said other of said first or second tooling sets to an idle position to allow said one tooling set portion to be positioned in alignment with the other tooling set portion.

* * * * *